Figure 1:
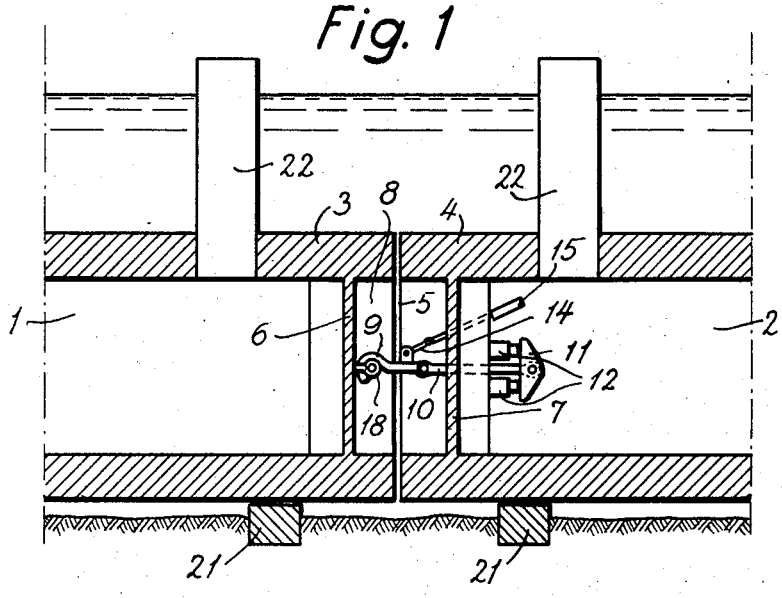

July 26, 1960 M. LASSEN-NIELSEN 2,946,197
APPARATUS FOR JOINING OF SUBMERGED STRUCTURES
Filed April 11, 1957 2 Sheets-Sheet 1

Inventor
M. Lassen-Nielsen
By Glascock Downing Seebold
Attys.

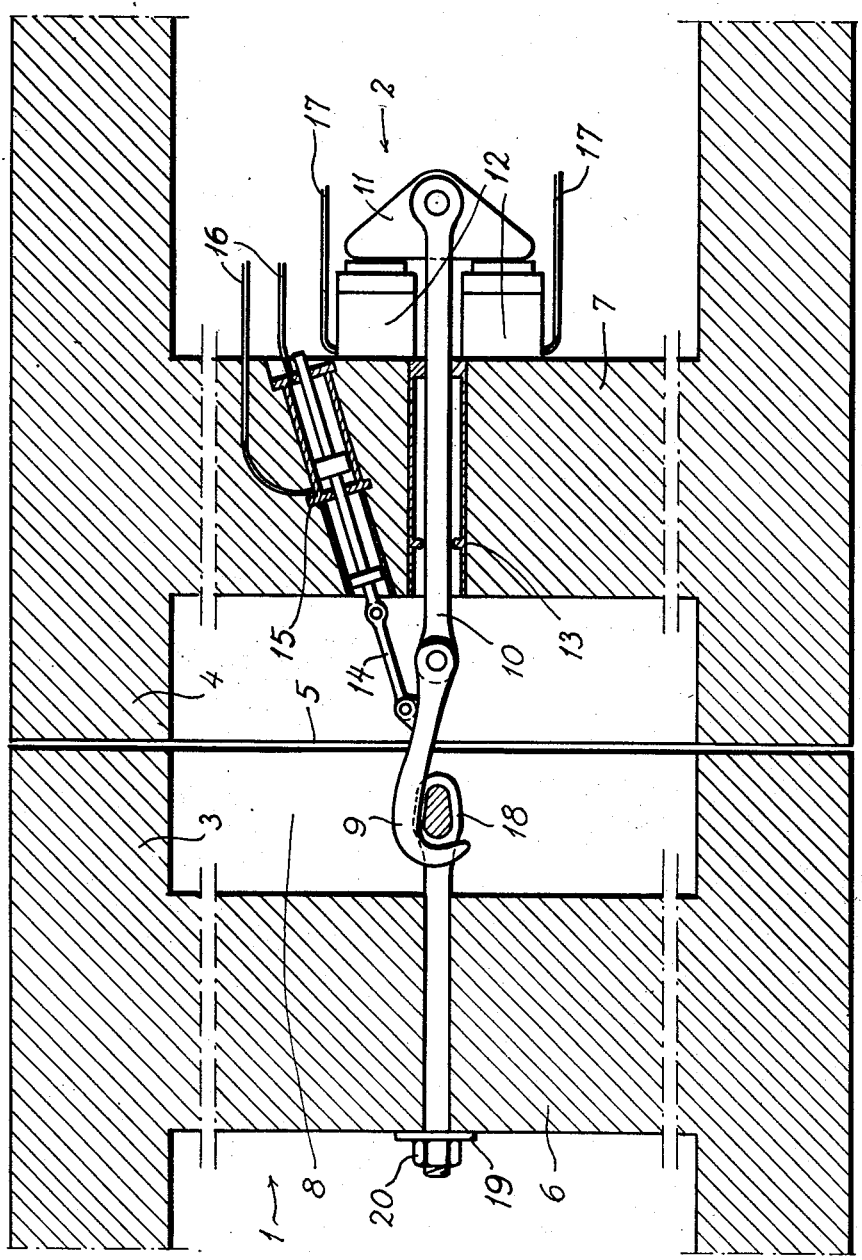

United States Patent Office 2,946,197
Patented July 26, 1960

2,946,197

APPARATUS FOR JOINING OF SUBMERGED STRUCTURES

Morten Lassen-Nielsen, Copenhagen, Denmark, assignor to Christiani & Nielsen, Vester Farimagsgade, Copenhagen, Denmark Filed Apr. 11, 1957, Ser. No. 652,134

Claims priority, application Denmark, Sept. 11, 1956

2 Claims. (Cl. 61—43)

The present invention relates to an apparatus for the joining of submerged structures.

It will often be desirable to be able to clamp together submerged structures in such a manner that watertightness will be ensured, either along protecting outer edges so that the space within the joined edges may be pumped dry, or so that the structures are so solidly joined as to act as one continuous structure towards external stresses. Such structures may for instance be cofferdams of steel or reinforced concrete for quay walls or piers, or be entirely submerged tubular structures or casings of circular, oval, rectangular or other cross-section, which when clamped together are to form a tunnel for cables or for traffic.

It has in many cases been the practice to attain the desired joining of the structures in such work by means of flanges on the exterior of the structures and clamped together by bolts or other clamping devices. The use of such external clamping devices will, however, entail the disadvantage that the work of joining the structures must be performed by divers, who in many cases will be prevented from doing the necessary work due to the fact that the clamping devices may be situated in inaccesible places or places of difficult access, for instance, if the structure is resting on the bottom. Consequently, it will be difficult to obtain a trustworthy joint along the whole circumference of the contact surfaces of the structures.

It is the object of the present invention to obviate this disadvantage and provide an apparatus by means of which the desired tightness may be ensured along the entire contact surfaces of the structures after submersion.

According to the invention this object is achieved by providing the contact surfaces of the structures to be joined with corresponding coupling and clamping devices projecting from the structures, of which at least those mounted on one structure are by transmission members connected with a traction mechanism inside such structure for the coupling and clamping together of the coupling and clamping devices. These devices may be constructed in many ways known to engineers, and may, for instance, consist of bayonet locks or bolts and nuts. As, however, in case of structures submerged in water, and particularly in case of large structures, considerable tolerances must be taken into account as regards the relative positions of the coupling and clamping devices to be joined together, it will, according to the invention, be expedient to use, as such devices, one or more eye-lugs on one structure and a corresponding number of hinged hooks in the other structure. These may be shifted in the direction of tension, so that these structures may be clamped together in a simple manner even if the coupling devices are offset in relation to each other.

An especially simple and reliable construction will be obtained, according to the invention, by placing turnable hooks on a tension-rod taken through a water-tight packing from the interior of the structure and connected to a traction mechanism situated inside the structure.

The drawing shows an embodiment of an apparatus, according to the invention, used for the clamping together of two tubular structures previously submerged.

Figure 2:
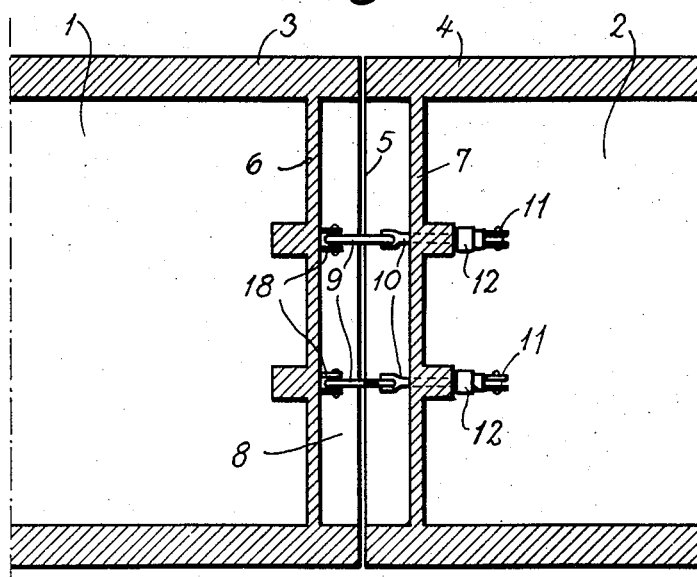

Fig. 1 shows the structure in vertical section and side elevation,

Fig. 2 a horizontal section through the same, seen from above, and

Fig. 3 on an enlarged scale the clamping device in side elevation and vertical section.

In the embodiment shown in the drawing the apparatus is used for the clamping together of two previously submerged structures 1 and 2, so formed as to be provided with projecting adges 3 and 4 which are to be clamped together along a joint 5. The walls 6 and 7 of the structures facing each other may be permanent parts of the structures, but may alternatively be provisional parts to be removed together with the clamping devices when the structures have been clamped together and permanently joined along edges 3 and 4. In the embodiment shown in the drawing walls 6 and 7 and the projecting edges 3 and 4 therefore enclose a space 8.

In the embodiment shown in the drawing the parts of the clamping device placed on structure 2 consist of hooks 9, each of which is hinged to a tension rod 10 carried through a watertight bushing 13 in wall 7 and carrying inside the structure a cross-beam 11 bearing against two hydraulic jacks 12. The hooks 9 are connected by links 14 with a double-acting jack 15, to which two pipes 16 for a pressure medium are connected, so that the link 14 may be moved forwards or backwards by supplying pressure through one pipe or the other and thereby lift or lower the hooks 9. Pressure-pipes 17 are likewise connected to each of the two hydraulic jacks 12.

On the other structure eye-lugs 18 are cast into the wall 6, and are in the embodiment shown provided with washers 19 and nuts 20 in the drawing on the inside of the wall.

When the structures are lowered to the levelled bottom or to foundations 21, hook 9 will be in raised position so that it will not protrude beyond the projecting edges 4. When the structures have been placed next to each other hooks 9 are lowered so that they will engage the eye-lugs 18, pressure medium being supplied through pipe 16, which may be brought above the surface of the water through shafts 22 on the structures. Pressure is thereupon similarly supplied to the jacks 12 and hooks 9 will then pull on the eye-lugs 18 with a force sufficient to pull the projecting edges 3 and 4 of the structures closely together along their entire contact surfaces.

If desired, the structures may thereupon, in a manner not shown, be tightly joined along the projecting edges 3 and 4, and walls 6 and 7 may then be pulled down, if they are not to be permanently used.

It will be appreciated from the above description that this invention obviates the use of divers for clamping together the two submerged structures, since such structures can be very bulky and heavy assemblages such as components for erecting traffic tunnels under water. The invention provides a means for forming a temporary joint between two components, which only during the sinking and the joining together are closed at both ends with the walls, which, when the projecting edges 3 and 4 have been permanently joined and made water-tight are to be broken away in conjunction with the temporary clamping means mentioned. It will be seen that the object of such clamping means is to hold the edges 3 and 4 together during the performing of the permanent joining.

The invention is not to be confined to any strict conformity with the showings in the drawings, but changes or modifications may be made therein so long as such changes or modifications mark no material departure from the spirit and scope of the appended claims.

I claim:

1. The combination with adjacent submerged structures, including separating wall means whereby at least one of said structures presents an air filled chamber enclosed from the surrounding water by said separating wall means, of means for clamping such structures together, said means comprising jack means positioned in the said air filled chamber in one of the structures to be clamped together, each structure having edges projecting beyond the separating wall means to define a space, tension rod means within and extending from said chamber through one of said wall means into the space and the surrounding water and operatively connected to the jack means whereby the jack means serves to pull said tension rod means, a hook hingedly connected to the tension rod means, a double acting jack means provided with controlling means located in the air filled chamber, a link hingedly connecting the double acting jack means and the hook, and an eye lug fixed to the outside of the separating wall means of the other structure and gripped by the hook upon activation of the jack means, the tension rod means, the hook and the eye lug coact to bring the facing projecting edges of the submerged structures into facial engagement.

2. An apparatus as claimed in claim 1 further including a water-tight bushing means surrounding the tension rod means.

References Cited in the file of this patent

UNITED STATES PATENTS

| | | |
|---|---|---|
| 550,914 | Hoyt | Dec. 3, 1895 |
| 870,931 | Claiborne | Nov. 12, 1907 |
| 1,395,125 | Lewis | Oct. 25, 1921 |
| 1,524,306 | Pearch | Jan. 27, 1925 |
| 2,570,546 | Hamlett | Oct. 9, 1951 |

FOREIGN PATENTS

| | | |
|---|---|---|
| 752,306 | Great Britain | Sept. 27, 1954 |